United States Patent [19]
Shimokasa

[11] Patent Number: 5,903,547
[45] Date of Patent: May 11, 1999

[54] ATM EXCHANGER

[75] Inventor: Kiyoshi Shimokasa, Tokyo, Japan

[73] Assignee: Mitsubishi Denki Kabushiki Kaisha, Tokyo, Japan

[21] Appl. No.: 08/779,241

[22] Filed: Jan. 3, 1997

[30] Foreign Application Priority Data

Mar. 28, 1996 [JP] Japan .................................. 8-074582

[51] Int. Cl.⁶ ..................................................... H04J 3/16
[52] U.S. Cl. ............................................ 370/232; 370/395
[58] Field of Search ..................................... 370/232, 395, 370/229, 230, 231, 235, 389, 396, 400, 401, 410

[56] References Cited

U.S. PATENT DOCUMENTS 5,654,964  8/1997  Wake ...................................... 370/395
5,701,292  12/1997  Chiussi et al. ......................... 370/232

FOREIGN PATENT DOCUMENTS 0481505  4/1992  European Pat. Off. .
5244193  9/1993  Japan .
9511557  4/1995  WIPO .
9519675  7/1995  WIPO .

*Primary Examiner*—Jeffery A. Hofsass
*Assistant Examiner*—Rafael A. Perez-Pineiro
*Attorney, Agent, or Firm*—Rothwell, Figg, Ernst & Kurz

[57] ABSTRACT

In a case where a signal from a G3FAX terminal is transmitted through an ATM network, the fact that the media is a G3FAX terminal is recognized in a tone detecting section or FAX protocol control section within an ATM exchanger and the data is digitized in and transmitted from the FAX processing section, but in this step a congestion level is identified by a congestion state detecting section according to the traffic data measured in the traffic measuring section as well as in the ATM bus control section and other device congestion data in the network, a transmission rate for G3FAX signal transmission is decided according to a congestion level in the FAX speed control section, and the connection protocol between G3FAX terminals is controlled by the FAX protocol control section to transmit the FAX signals controlling a transmission rate between G3FAX terminals.

8 Claims, 10 Drawing Sheets

ATM EXCHANGER

FIELD OF THE INVENTION

The present invention relates to an ATM (Asynchronous Transfer Mode) exchanger executing statistical multiplexed transmission of digitalized low speed to high speed multimedia signals such as data signals, voice signals, and image signals from data terminals, private branch exchanges or the like through a public network such as an ATM transmission path, a high speed digital private line or an ISDN (Integrated Services Digital Network) line.

BACKGROUND OF THE INVENTION

FIG. 9 is an explanatory view showing an example of utilization of an ATM exchanger in the conventional technology, and in this figure, designated at the reference numeral 27 is an ATM exchanger, at 28 is a private branch exchanger (described as PBX hereinafter), at 29 is a G3FAX machine, and at 30 is a telephone set. The ATM exchanger 27 by its nature is a device for transmission of digitized low speed to high speed multimedia signals such as data signals, voice signals, and image signals from data terminals or the PBX 28 out over a network, and description is made below for a case where a terminal (G3FAX machine 29, telephone set 30) is connected via the ATM exchanger 27 to the PBX 28.

The ATM exchanger 27 is connected to a public line network such as an ATM transmission path, a high speed digital private line or an ISDN line, and is used to improve efficiency in use of these lines due to the statistical multiplexed effect, and as a result, forms an ATM network.

In FIG. 9, a PBX 28 is connected to each of station A, station B, and station C as key points in this ATM network, and terminal equipment such as a G3FAX machine 29 and a telephone set 30 as network users are connected to the PBX 28 of each station. Each terminal can be connected via the PBX 28 to a terminal in another station by dialing the number of such terminal, but as a method of improving the line efficiency in the ATM network, in addition to the method based on the statistical multiplication effect, there is a method of further improving the efficiency in use of a line by identifying media transmitted from a terminal via the PBX 28 in the ATM network and executing voice compression processing for a voice (telephone set 30) or by converting the media to digital data and transmitting the data at a bearer speed.

FIG. 10 is a block diagram showing configuration of the ATM exchanger 27 as a general system based on the conventional technology, and in this figure designated at the reference numeral 1 is a device control section for controlling the entire ATM exchanger 27, at 2 a line interface section, and at 3 a PBX interface section.

Also designated at 4 is a device control section within the device control section 1 for monitoring trouble in a device and processing calls (talking path setting processing) or the like, and at 5 is an ATM bus control section for controlling the ATM bus 6.

And designated at 7 is a line interface section functioning as an interface with a line provided in the line interface section 2, at 8 a cell assembly/disassembly processing section for providing controls for STM/ATM exchange (STM=Synchronous Transfer Mode) or for ATM cells provided in the PBX interface section 3 as well as in the line interface section 2, at 9 an ATM bus exchange processing section for executing processing for switching to the ATM bus 6 (also provided in both sections 2 and 3), at 10 is a PBX line interface section provided in the PBX interface section for terminating an interface with the PBX 28.

Furthermore 11, 12 are selectors selectively connecting data to the voice processing section 13 or the FAX processing section 14 according to an instruction from the FAX protocol control section 15; 13 is a voice processing section for executing such processing as voice compression processing, at 14 is a FAX processing section for executing conversion of FAX data transmitted within the PCM sound band to digital data with a bearer speed, at 15 a FAX protocol control section which monitors data in the talking path and identifies media for each data and is capable of executing operations according to the G3FAX protocol based on the FAX protocol according to the ITU-T T.30. 16 is a tone detecting section for detecting a tone having a frequency of 2,100 Hz which is one of the requirements for G3FAX detection.

Next description is made of the operation. A connection request from terminal equipment such as the telephone set 30 or the G3FAX machine 29 is executed via the PBX 28 to the ATM exchanger 27. The ATM exchanger 27 constituting the ATM network terminates the connection request signal at the PBX line interface section 10 inside the PBX interface section 3 in a case where it functions as a relay exchanger according to the mode in use, and there are cases where a talking path is set by dialing the dial number and then data transmission is executed from the terminal, and where data is transmitted from the terminal through a talking path previously set irrespective of a particular connection request signal.

In either case, when a connection request is issued from a terminal and then data transmission is started, in the PBX interface section 3, the selectors 11, 12 select the voice processing section 13, where the signals are subjected to processing such as voice compression for sound data, and further processing in the cell assembly/disassembly processing section 8 and the ATM bus exchange processing section 9 required for ATM transmission are added thereto, and the signals are connected in a cell form to the ATM bus 6 for exchange.

As for the cell exchanged with the ATM bus control section 5 within the device control section 1 in the ATM bus 6, the contents of a cell control field required in the ATM bus exchange processing section 9 and cell assembly/disassembly processing section 8 are rewritten in the line interface section 2, and are sent via the line interface section 7 to a line. A cell received from a line is transmitted through a route reverse to that described above, namely via the line interface section 2, ATM bus 6, and PBX interface section 3 to the PBX 28 in a form of PCM sound data (STM), thus bidirectional voice communications are executed between terminals.

In this processing for communications as described above, generally the G3FAX machine 29 cannot transmit signals at an appropriate speed or becomes incapable of signal transmission due to voice compression processing or the like in the voice processing section 13. For this reason, in the PBX interface section 3, when communication is started, controls are provided so that the selectors 11, 12 select the voice processing section 13 assuming the communication media to be a sound signal as described above, but there also are provided the tone detecting section 16 and the FAX protocol control section 15 to identify other media during voice communication over a telephone line.

In a case where it is determined by tone detection (2,100 Hz tone or the like) or by 300 bps preamble detection with the control sections described above that the communication media is the G3FAX machine 29, the FAX protocol control section 15 provides controls for switching the selectors 11, 12 from the voice processing section 13 to the FAX processing section 14. By providing a FAX modem function in the FAX processing section 14, high efficiency transmission is realized in the ATM network as in the case of sound transmission at the bearer speed, by converting the sound band data of the G3FAX machine 29 to digital data.

The G3FAX transmission system in the conventional type of ATM exchanger is based on the configuration as described above, so that in the ATM network constructed with ATM exchangers as the base, transmission traffic becomes excessive, and in a case where a congested state is generated in the ATM network, signal transmission is executed by terminals operating at the G3FAX transmission rate, whereby cells are discarded in other traffic or in the G3FAX transmission itself, and for this reason transmission can not always be executed under stable conditions.

SUMMARY OF THE INVENTION

It is an object of the present invention to obtain an ATM exchanger which can detect a congested state due to increase of traffic volume, control a transmission rate for the G3FAX machine according to the congested state, reduce a volume of traffic flowing into the ATM network in the congested state by reducing a transmission speed of the G3FAX machine and execute signal transmission under stable conditions because cell discard is hardly generated in the line.

A further object of the present invention is to obtain an ATM exchanger which can reduce the number of lines required between ATM exchanges because line designing can be carried out based on average line traffic designing for a system using ATM exchangers.

The ATM exchanger according to the present invention measures a number of cells transmitted and received on a line and a traffic volume on the ATM bus decides a G3FAX transmission rate according to the measured value, and also relay and transmits protocols between G3FAX terminals, so that a transmission rate for the G3FAX machine generally decided between terminals due to a congested state in the line or in the ATM exchanger can be decreased with the ATM exchanger.

The ATM exchanger according to this invention collects data on congestion in other ATM exchangers within the ATM exchanger network, and controls a volume of traffic flowing into the ATM transmission path or the ATM bus depending on the collected.

With the ATM exchanger according to this invention, a volume of traffic flowing into the ATM transmission path or the ATM bus according to a level of a congested state is controlled in response to use conditions for a user by assigning a preference degree for use of G3FAX to each channel based on the congestion level output.

With the ATM exchanger according to this invention, a volume of traffic flowing into the ATM exchanger, ATM transmission path, and ATM bus is controlled based on a load to processors used in the ATM exchanger and according to a processing load in the ATM exchanger and a congested state in the entire communication path.

In the ATM exchanger according to this invention, a volume of traffic flowing into the ATM transmission path or ATM bus is controlled according to a congested state in the entire communication path for a specified period of time.

With the ATM exchanger according to this invention, a volume of traffic flowing into the ATM transmission path or ATM bus is controlled for decreasing the transmission rate of the G3FAX machine before a congested state occurs in the ATM exchanger by previously estimating a congested state in the communication path according to an estimated change in the traffic.

In the ATM exchanger according to this invention, in a case where it is determined that communication request media is a G4FAX (i.e. digital transmission) machine and the ATM exchanger network is in a congested state, a volume of traffic flowing into the ATM transmission path or ATM bus is controlled according to the congested state in the communication path by converting the data to a sound band transmission (G3FAX).

The ATM exchanger according to another aspect of the present invention comprises an ECM control section in the FAX processing section, and controls a volume of traffic flowing into the ATM transmission path or the ATM path by controlling a transmission packet interval in the ECM according to a temporary congested state in the ATM network with the ECM control section.

The ATM exchanger according to this invention further controls a volume of traffic flowing into the ATM transmission path or ATM bus by controlling a ECM transmission packet interval according to a temporary congested state in the ATM network.

Other objects and features of this invention will become understood from the following description with reference to the accompanying drawings.

DESCRIPTION OF THE PREFERRED EMBODIMENTS

Next description is made for embodiments of the ATM exchanger according to the present invention with reference to the related drawings.

Figure 1:
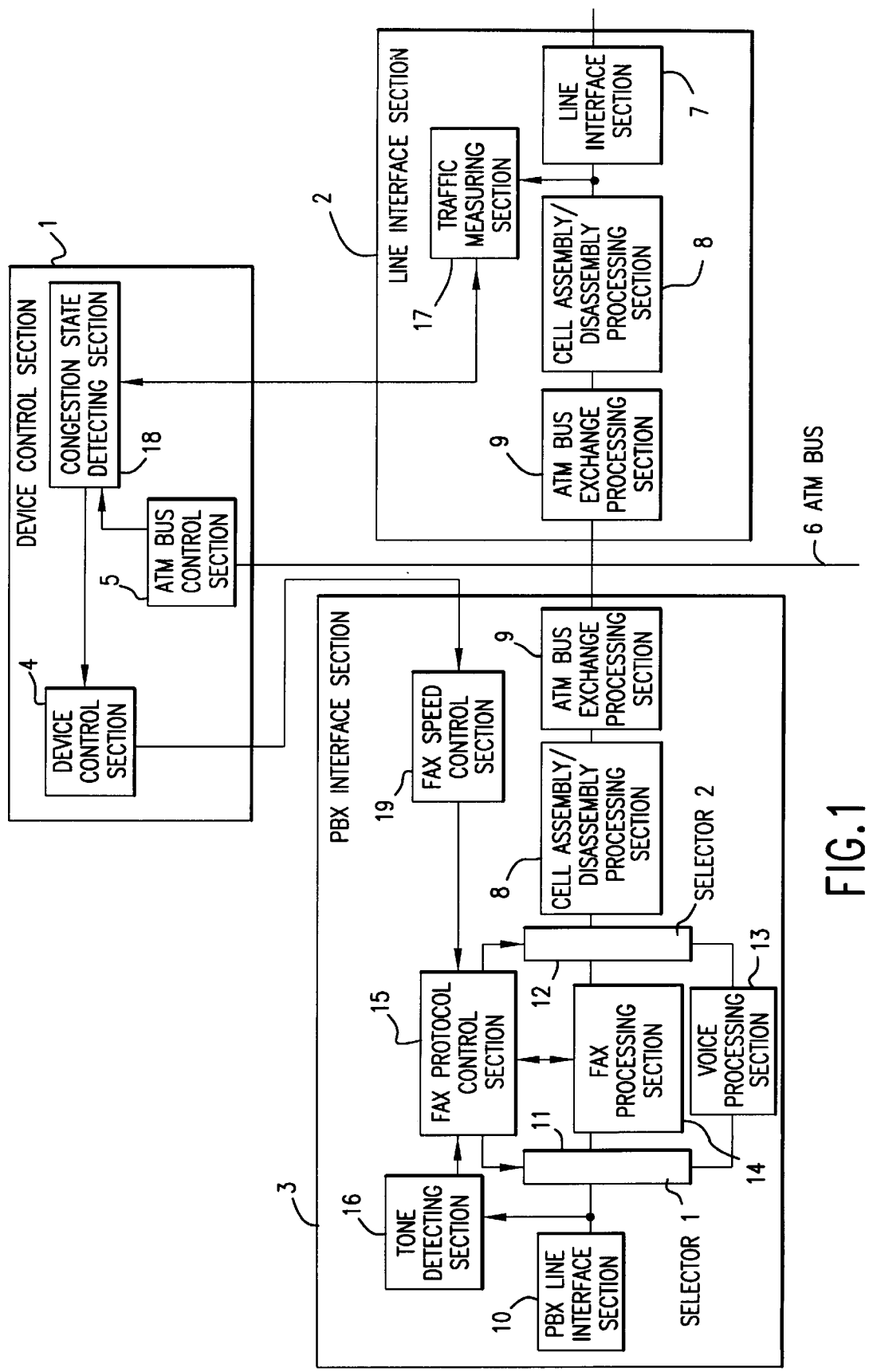
FIG. 1 is a block diagram showing configuration of the ATM exchanger according to Embodiment 1 of the present invention.

FIG. 1 is a block diagram showing internal configuration of the ATM exchanger according to the present invention, and in this figure, designated at the reference numeral 1 is a device control section for providing controls over the entire ATM exchanger, at 2 is a line interface section, at 3 a PBX interface section, at 4 a device control section for providing controls such as failure monitoring and call processing (processing for setting a talking path) inside the device control section 1.

Also designated at the reference numeral 7 is a line interface section for interfacing with a line provided in the line interface section 2, at 8 is a cell assembly/disassembly processing section for providing controls for an STM/ATM converting function provided in the PBX interface section 3 and in the line interface section 2 and an ATM cell control section, at 9 an ATM bus exchange processing section for executing processing for switching with the ATM bus 6, and at 10 is a PBX line interface section for terminating interface with the PBX provided in the PBX interface section 3.

Also designated at the reference numerals 11 and 12 is a selector capable of selectively connecting data to the voice processing section 13 or FAX processing section 14 according to instruction from the FAX protocol control section 15, at 13 a voice processing section for executing such processing as voice compression processing or the like, at 14 a FAX processing section for executing processing for converting FAX data transmitted within an PCM data band to digital data having a bearer speed, at 15 a FAX protocol control section monitoring transmission data in the talking path, having a media discriminating function for transmission data, and capable of manipulating the G3FAX protocol similar to the FAX protocol based on the ITU-T T.30.

Also designated at the reference numeral 16 is a tone detecting section for detecting tone having a frequency of 2,100 Hz which is one of the conditions for detection of G3FAX signal transmission, at 17 is a traffic measuring section comprising a counter provided in the line interface section 2 for detecting a number of cells transmitted on the line, at 18 a congestion state detecting section provided in the device control section 1 for detecting a congested state according to a volume of traffic counted in the ATM bus control section 5 and in the traffic measuring section 17, and at 19 is a FAX speed control section provided in the PBX interface section 3 for deciding a transmission rate for a G3FAX machine according to a congested state.

The most important function of an ATM exchanger is to execute statistical multiplex transmission of low speed to high speed multi-media signals such as data signals, voice signals, and image signals from data terminals, telephone sets, PBX, and TV conference devices in batches through an ATM transmission path such as a cell relay circuit or through a public line network such as a high speed digital line or an ISDN line. In the multiplex transmission method through the line, generally the cell as shown, for instance, in the ATM form is used.

Next description is made of the operation. The following description is made for a case where, in FIG. 1, a talking path is set from a terminal accommodated in a PBX via the PBX line interface section 10. In a case of an ATM exchanger in a transmitting station, a terminal such as a PBX with a telephone set connected thereto executes an operation for connecting to a called terminal by dialing a telephone number of the called terminal.

In the ATM exchanger, an interface with a terminal (a PBX) is provided by the PBX line interface section 10, and it is detected that a talking path connection request has been generated according to a protocol with the PBX. The protocol in this case, for instance, a protocol for connection to a PBX is based on the SS/SR signal system or PBX signal system described in the TTC standard JT 20. 12 or the like, or is an ISDN protocol.

The PBX line interface section 10 having detected a request for connection reports the request data to the device control section 4 within the device control section 1, for instance, in a case where a relay exchange function is provided in the ATM exchanger. The device control section 4 determines the target for connection based on the dialed number sent, for instance, from a terminal according to previously set date and a range for connecting to the target and executes talking path setting processing so that a line leading to the target is selected. In this step, in the PBX interface section 3, at first the selectors 11, 12 select the voice processing section 13, subject the data for the talking path to processing such as voice compression in the voice processing section 13, and transmit the data.

The data received by and sent from the PBX side is based on the STM transmission system, and conversion of such data to a form of cells which can be transmitted through an ATM transmission path is executed by the cell assembly/disassembly processing section 8. When switching in the ATM bus 6, data converted to cells in each interface section is exchanged cell by cell in the ATM bus exchange processing section 9.

In the line interface section 2, the number of cells received from and sent to the line is counted by the traffic measuring section 17, and in the ATM bus control section 5 a number of cells present on the ATM bus 6 is counted.

In the congestion state detecting section 18 in the device control section 1, the counter data is maintained for a specified period of time, and the counter is cleared according to the same timing, and thus a volume of traffic on the ATM bus 6 is measured. Further, a congestion level is detected by the congestion state detecting section 18 according to the measured traffic volume in reference to preset data, the data on the congestion level is transferred via the device control section 4 to the FAX speed control section 19 in the PBX interface section 3, where a transmission rate allowable for the G3FAX machine corresponding to the congestion level is identified in reference to preset data, and the result thereof is transmitted to the FAX protocol control section 15.

During communication, if a connecting terminal is a G3FAX machine, a tone with a frequency of 2,100 Hz or 300 bps preamble is initially sent to the communication path for protocol control with the connected terminal. The tone detecting section 16 is provided in the PBX interface section 3 for detecting the former, and the latter can be detected by the FAX protocol control section 15.

In a case where either such signal is detected, the FAX protocol control section 15 switches the selectors 11, 12 to the FAX processing section 14 and also convert sound band data to digital data with a FAX modem, which is a function of the FAX processing section 14 for G3FAX signal transmission, to thus efficiently execute signal transmission.

The FAX protocol control section 15 monitors a connection sequence (based on ITU-T T.30) for G3FAX signal transmission generally executed between terminals, and controls the FAX processing section 14 at a modem speed corresponding to the transmission rate decided upon between the terminals for enabling relayed transmission.

However, in a case where an instruction for a transmission rate corresponding to a congested state has been issued from the FAX speed control section 19, the FAX protocol control section 15 preempts the connection protocol between terminals, and reset the allowable maximum transmission rate to the instructed speed according to a DIS (Digital Identification Signal) to change the actual transmission rate between G3FAX machines.

In a case where the transmission rate is changed to a speed not controllable with a DIS signal, a transmission rate between the G3FAX machines is changed with the fall-back function automatically executed by each terminal by cutting a talking path during training between terminals.

With the ATM exchanger having the functions as described above, a traffic volume is kept at a constant value or greater, and if a line or an ATM exchanger enters a congested state, it is possible to reduce the G3FAX transmission rate, and a volume of traffic flowing into the line or the ATM exchanger can be reduced so that a frequency of errors stopping G3FAX service or causing cell discarding is reduced.

Figure 2:
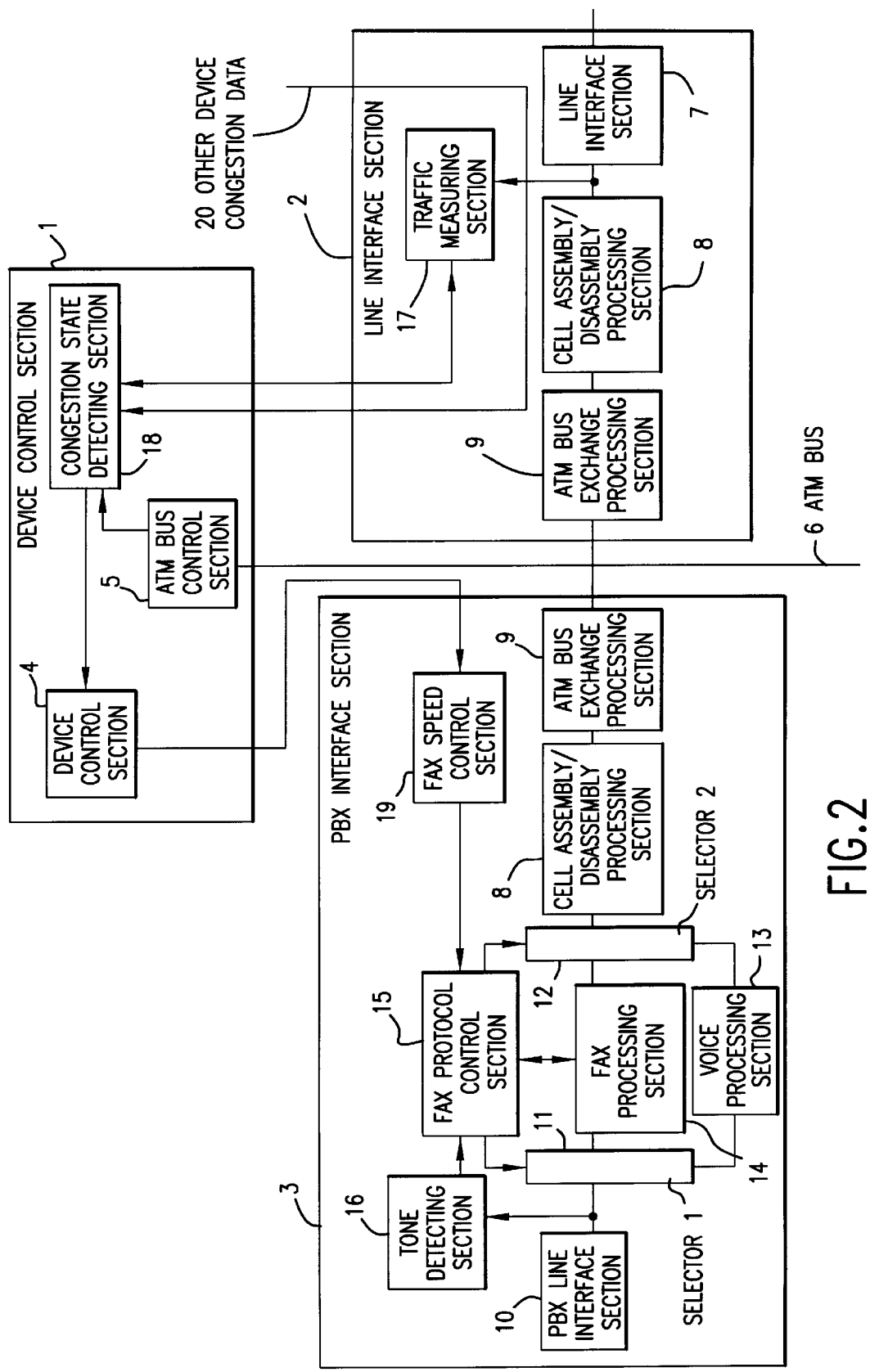
FIG. 2 is a block diagram showing configuration of the ATM exchanger according to Embodiment 2 of the present invention.

The description above for Embodiment 1 assumes a system in which a transmission rate for G3FAX signal transmission can be changed according to a congested state in an ATM exchanger, but in Embodiment 2, as shown in FIG. 2, data for congestion in other devices in the ATM network (other device congestion data 20) is controlled by the congestion state detecting section 18 by means of message transfer between ATM exchangers to manage the total congested state in the entire ATM network so that at ATM exchanger in the network in which congestion of the communication path has occurred is detected and also a transmission rate is detected by the FAX speed control section 19.

In this embodiment, in a case where a system using ATM exchangers is constructed, it is important to automatically select an optimal route for a communication path taking a congested state in the entire network into consideration, but an excessive volume of traffic can be injected into a line or an ATM exchanger, so, in such the case, a volume of traffic flowing thereinto can be reduced by controlling a congested state in the entire network with each ATM exchanger.

Figure 3:
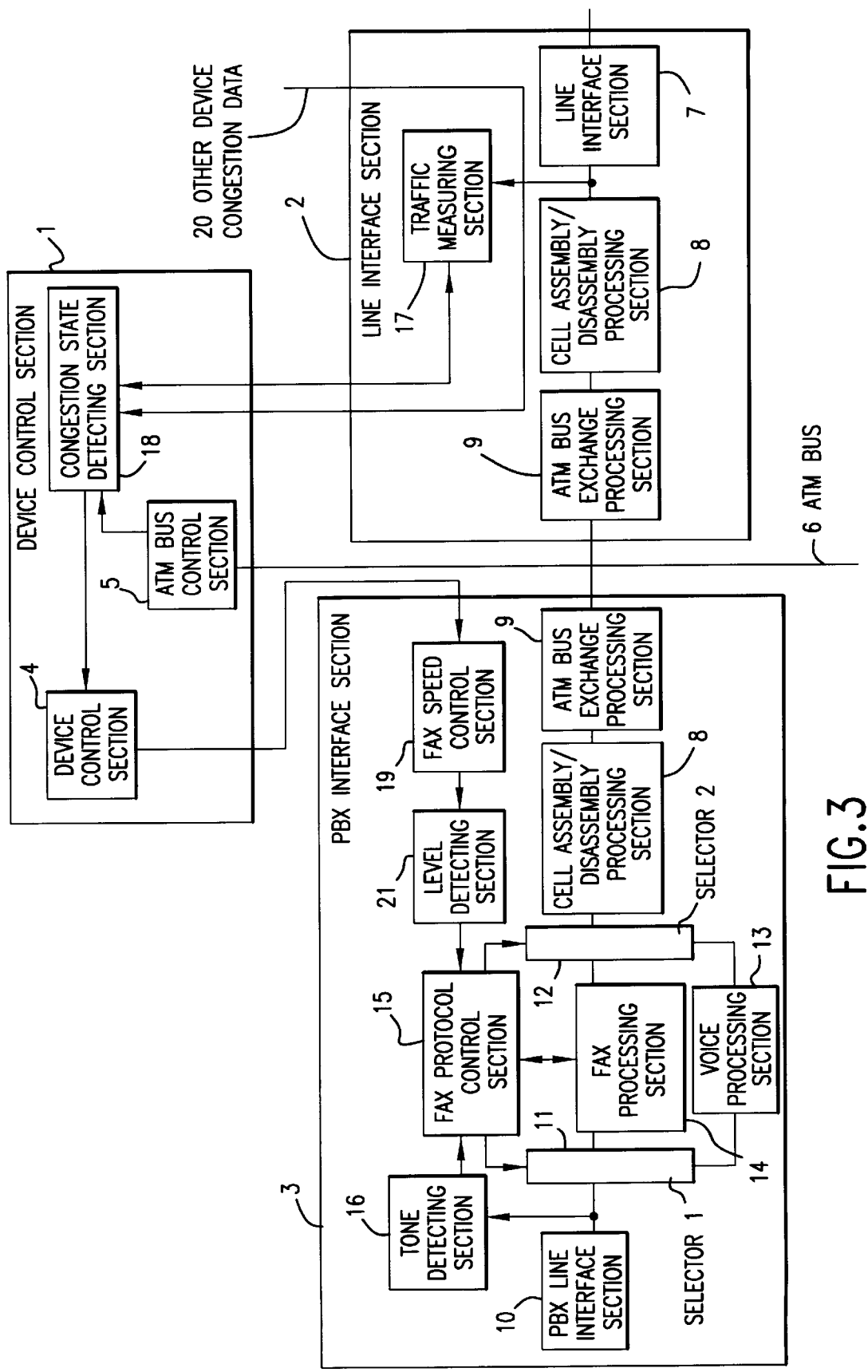
FIG. 3 is a block diagram showing configuration of the ATM exchanger according to Embodiment 3 of the present invention.

The description of Embodiment 2 above assumes a case where a transmission rate for G3FAX transmission rate is changed according to a congested state in an ATM exchanger within the ATM network, but in Embodiment 3 of the present invention, as shown in FIG. 3, a priority order is assigned to the FAX transmission rate detected in the FAX speed control section 19 for each channel by the level detecting section 21, and a transmission rate can be changed for each channel according to the congestion level.

In this embodiment, such minute and user-friendly services as enabling transmission to important users without lowering the transmission rate becomes possible between sharing a channel by a PBX and an ATM exchanger.

Figure 4:
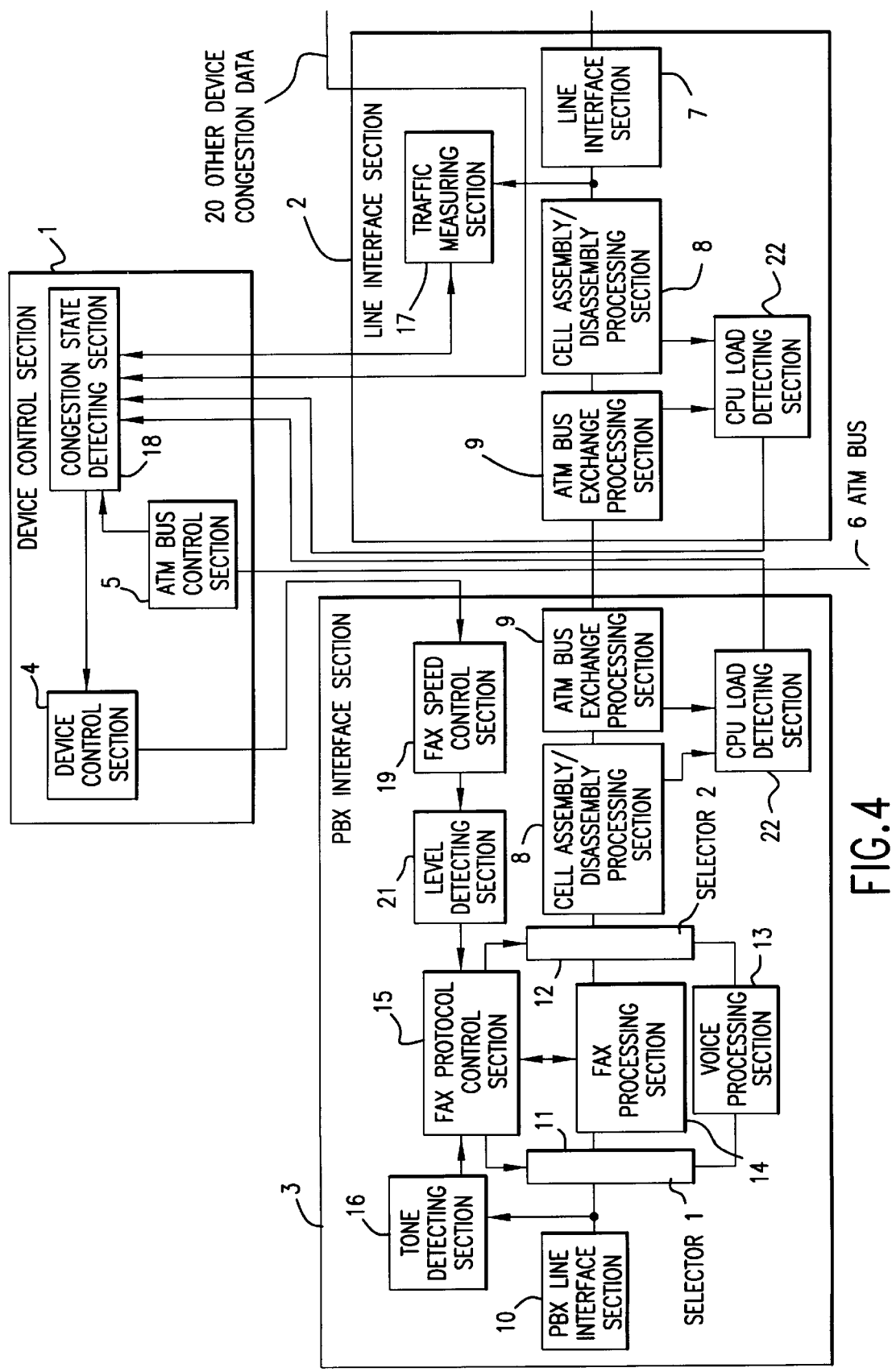
FIG. 4 is a block diagram showing configuration of the ATM exchanger according to Embodiment 4 of the present invention.

Further, in Embodiment 4 of the present invention, as shown in FIG. 4, a CPU load detecting section 22 for measuring a load on each of the processors in an ATM exchanger is provided, the processors are controlled according to a congested state detected by the congestion state detecting section 18 to control a transmission rate for G3FAX signal transmission according to a load on each processor in the device so that a volume of traffic to be processed can be reduced.

As processing for rewriting a header in a cell is often executed cell by cell by a processor in an ATM exchanger, in this embodiment, a volume of in-coming traffic is reduced by detecting a limit of capability of each processor, thus cell discarding due to excessive load on a processor is prevented.

Figure 5:
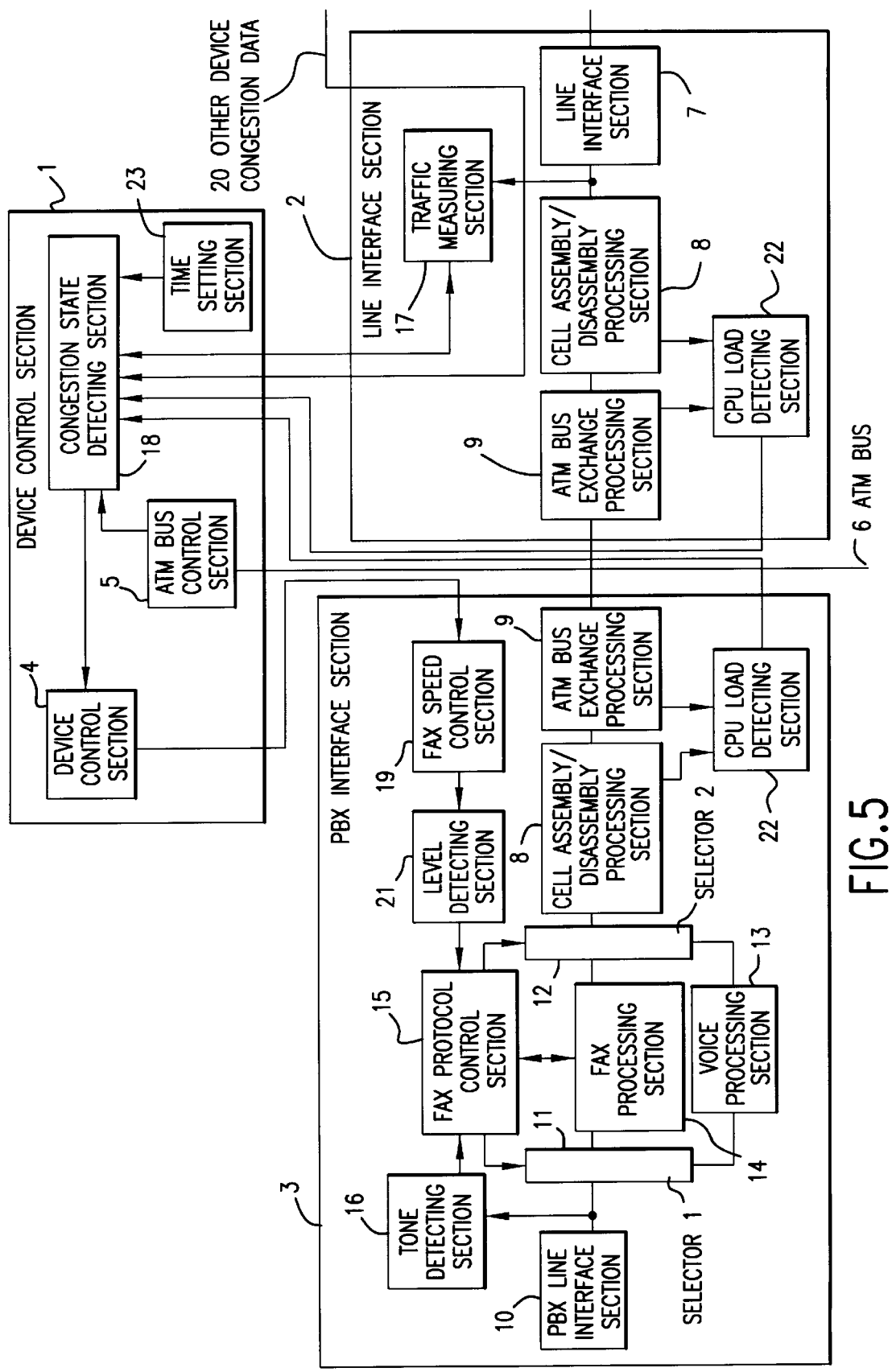
FIG. 5 is a block diagram showing configuration of the ATM exchanger according to Embodiment 5 of the present invention.

Further, in Embodiment 5 of the present invention, as shown in FIG. 5, a time setting section 23 is provided in the device control section 1, and the congested state detecting function is enabled only for a time zone set in the time setting section 23.

In this embodiment, the highest priority in the ATM network is given to data transmission, for which real time operation is required, such as voice signal transmission or G3FAX signal transmission, and the data transmission is preferentially executed as compared to other types of transmission, and in this system a transmission rate for G3FAX signal transmission is lowered in a time zone previously specified for data transmission to and from important users, and in other time zones no restriction is placed on G3FAX signal transmission so that the G3FAX signal transmission is preferentially executed, which allows design of a flexible ATM network.

Figure 6:
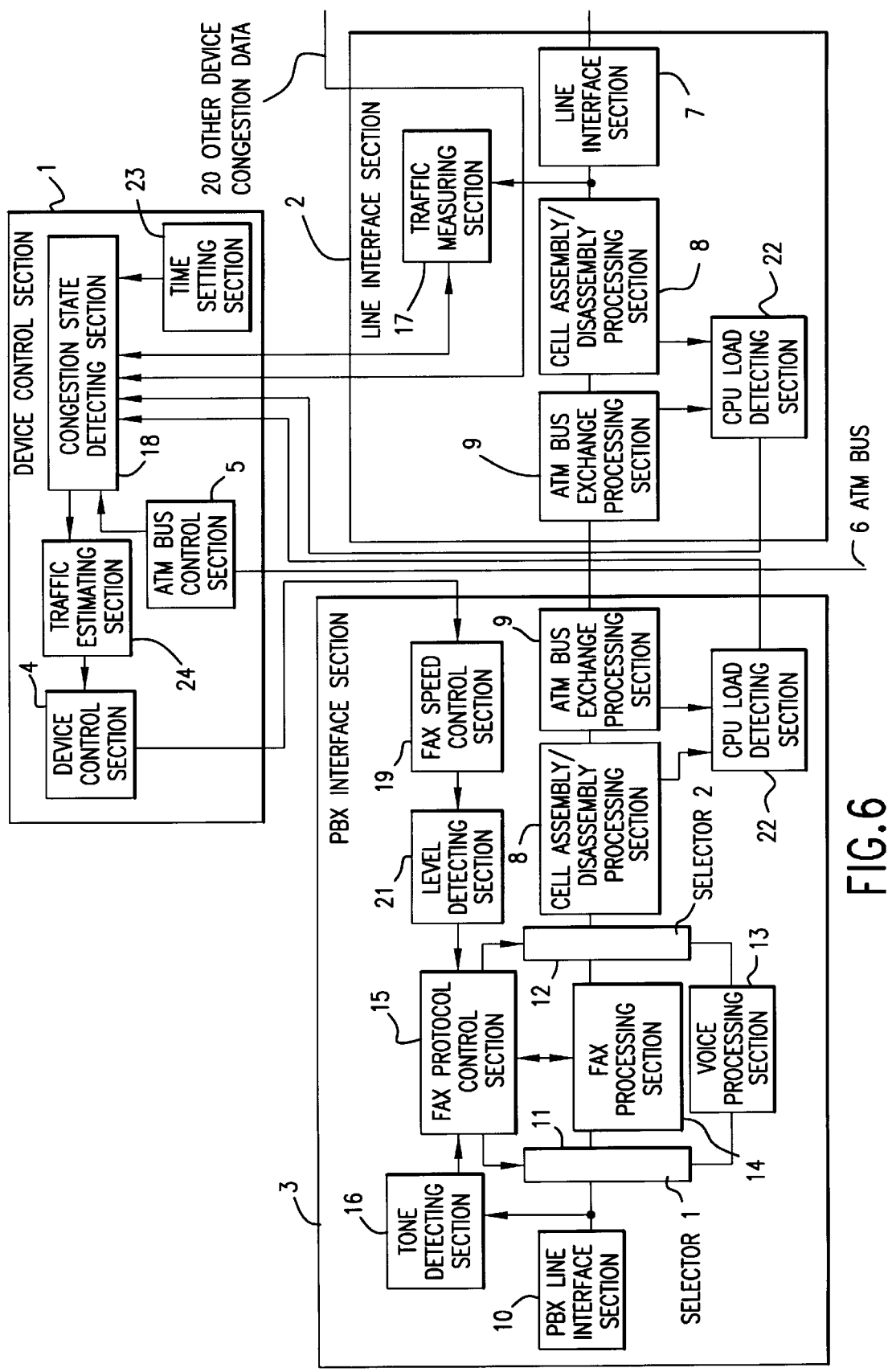
FIG. 6 is a block diagram showing configuration of the ATM exchanger according to Embodiment 6 of the present invention.

Furthermore in Embodiment 6 of the present invention, as shown in FIG. 6, a traffic volume detected by the congestion state detecting section 18 is inputted into a traffic estimating section 24, where change of traffic is statistically estimated, and thus a transmission rate for G3FAX signal transmission is changed not according to the actual traffic volume but according to the estimated congestion level.

In this embodiment, in contrast to the fact that in Embodiment 1 to Embodiment 5 processing is executed according to the actual congested state, a transmission rate for G3FAX signal transmission can be changed by estimating the congested state in the near future, so that a volume of in-coming traffic can be reduced before cell discarding is actually initiated.

Figure 7:
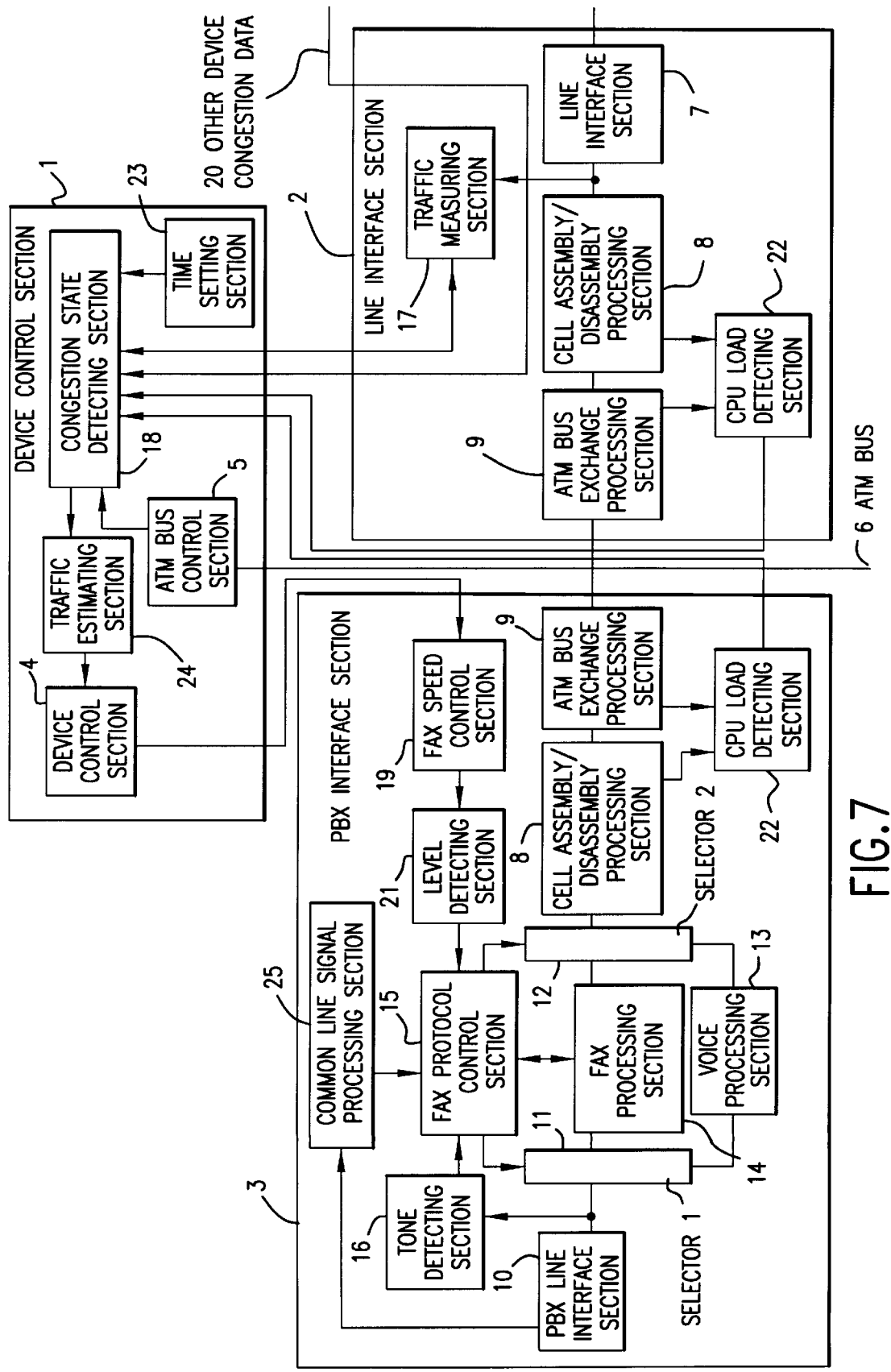
FIG. 7 is a block diagram showing configuration of the ATM exchanger according to Embodiment 7 of the present invention.

In Embodiment 7 of the present invention, as shown in FIG. 7, a common line signal processing section 25 is provided in the PBX interface section 3, and for instance when a PBX and an ATM exchanger are connected to each other with common line signals (ISDN), if media from a terminal is identified as G4FAX signals in the common line signal processing section 25, the bearer capability in the ISDN message is converted from unlimited digital signals for G4FAX signal transmission to sound band data for G3FAX signal transmission according to the congested state.

In this embodiment, even if a communication terminal is a G4FAX machine, by exchanging common line signals between ATM exchangers, the machine is used through the G3FAX function incorporated in an ordinary G4FAX terminal, and thus also a speed for a G4FAX machine can be changed according to a congestion level.

Figure 8:
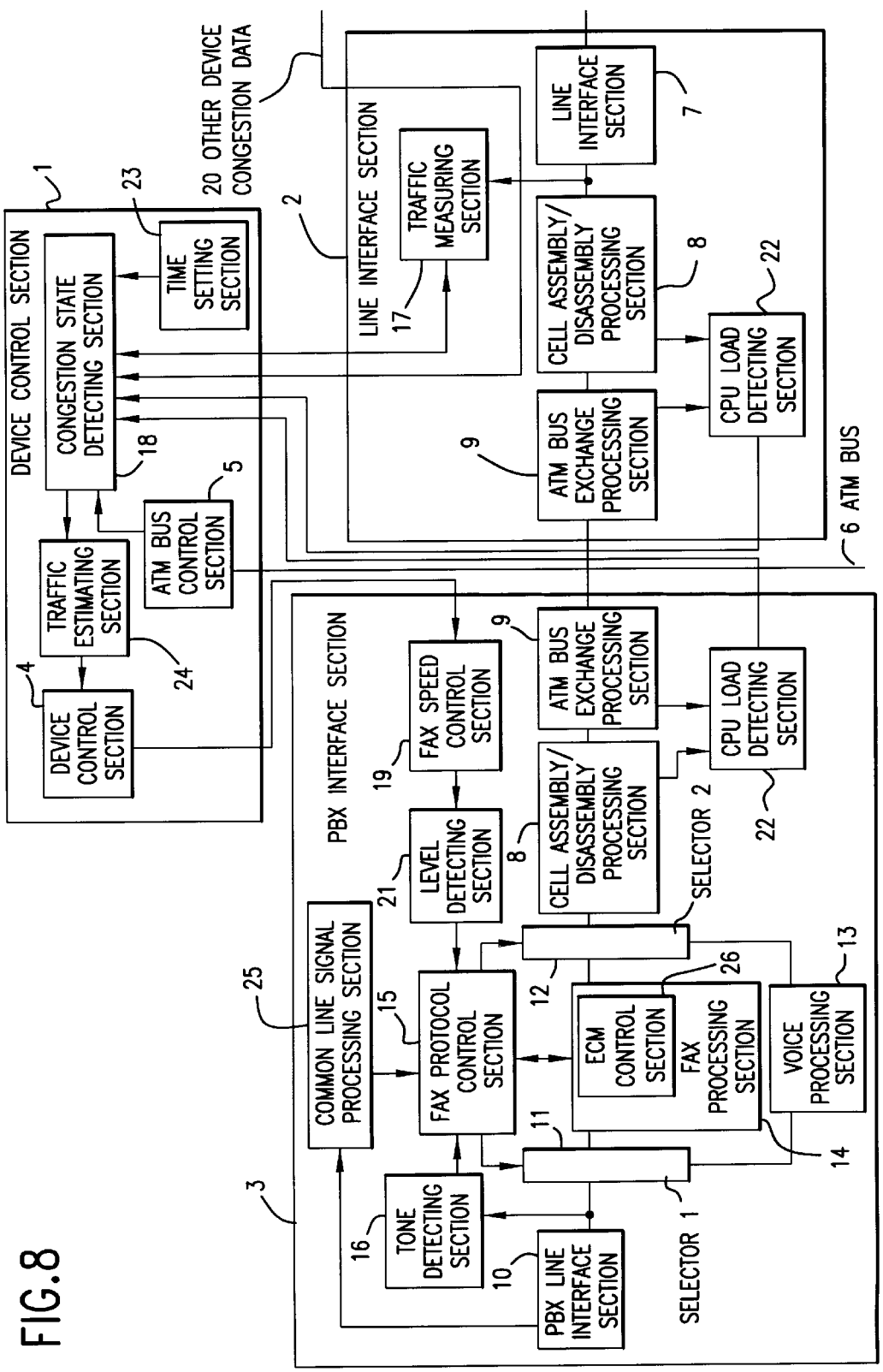
FIG. 8 is a block diagram showing configuration of the ATM exchanger according to Embodiment 8 of the present invention.
Figure 9:
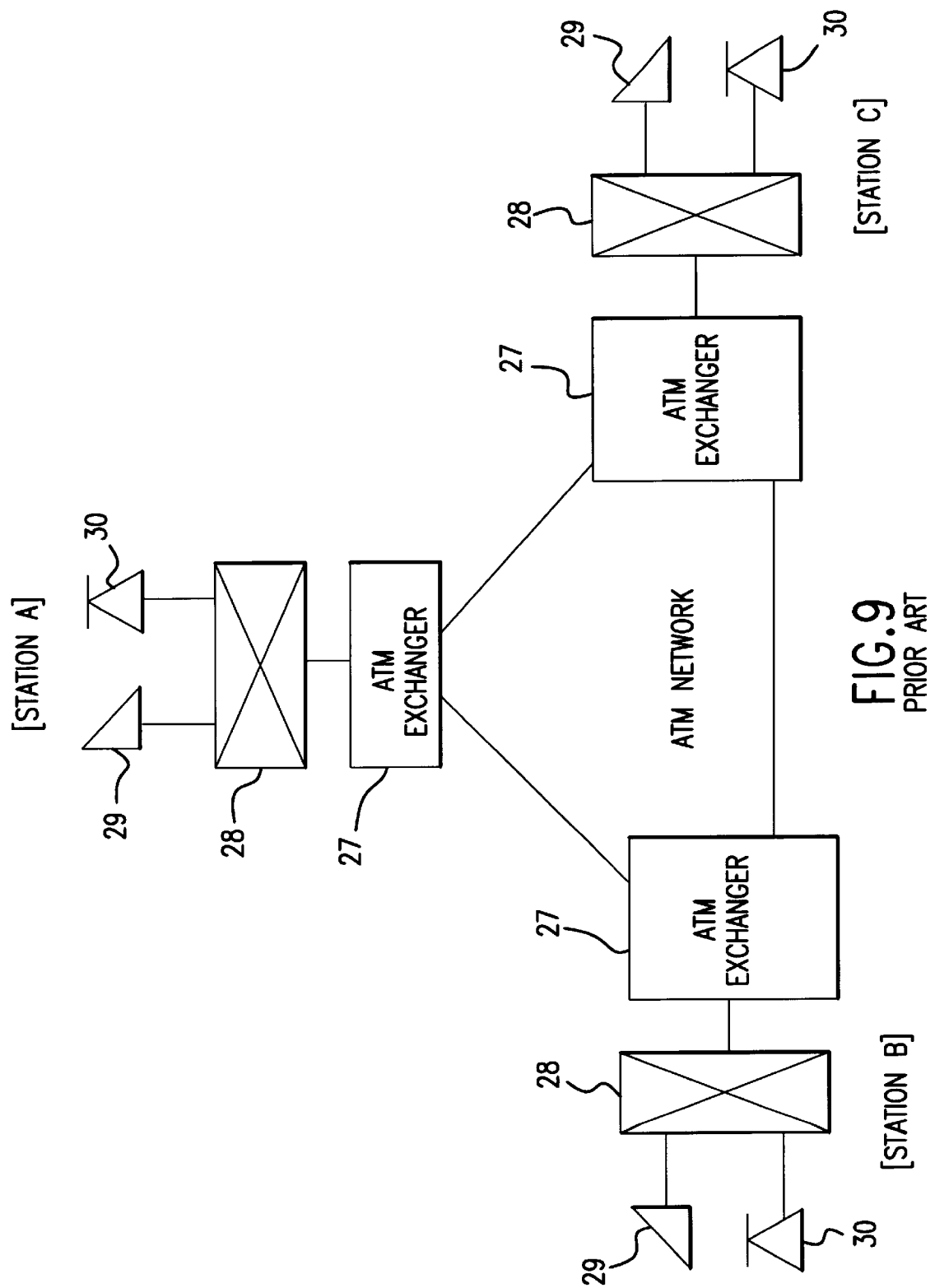
FIG. 9 is an explanatory view showing an example of a conventional ATM network.
Figure 10:
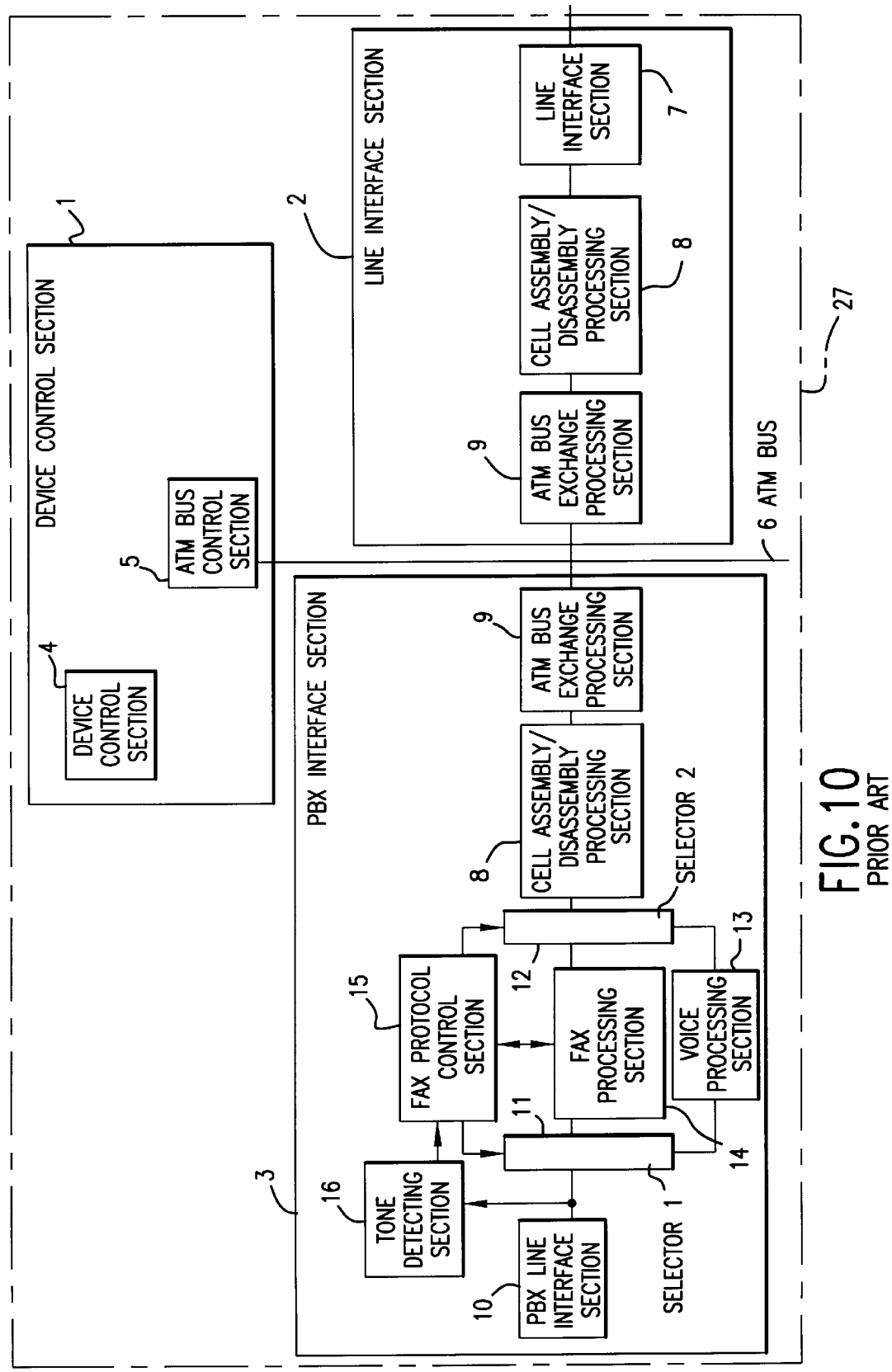
FIG. 10 is a block diagram showing configuration of an ATM exchanger based on the conventional technology.

In Embodiment 8 of the present invention, as shown in FIG. 8, an ECM (Error Correction Mode) control section 26 having a data accumulating function is provided in the FAX processing section 14, and a volume of ECM packets sent out is controlled according to a congestion level.

In this embodiment, in a case where a congestion level is relatively low and the congestion can be regarded as temporary, a volume of cells flowing into the ATM network can be reduced by temporarily making larger a packet transmission interval in the ATM exchanger to lower the transmission rate without decreasing the transmission speed between G3FAX terminals.

As described above, in the present invention, a speed for G3FAX signal transmission can be reduced by detecting a congested state due to increase of a volume of traffic transmitted through an ATM network and controlling a transmission rate for G3FAX signal transmission in the ATM exchanger according to a level of the detected congestion, so that a volume of traffic flowing into the ATM network with congestion having been generated therein can be reduced, cell discarding is minimal, the line can efficiently be utilized, and furthermore line designing can be executed with an average volume of traffic for a system using ATM exchangers therein, and for the reasons as described above, a number of lines between ATM exchangers can be reduced.

With another aspect of the present invention, a volume of in-coming traffic can be reduced by managing the congested state in the entire network in each ATM exchanger.

With another aspect of the present invention such minute and user-friendly services as enabling ordinary transmission to important users without lowering the transmission rate can be provided between sharing a channel by a PBX and an ATM exchanger.

With another aspect of the present invention, generation of cell discarding due to an excessive load on a processor can be reduced by detecting a limit of a processor's capability and reducing a volume of traffic flowing thereto.

With another aspect of the present invention, although a transmission rate for G3FAX signal transmission to and from important users is lowered in a specified time zone, but in other time zones no restriction is placed on the G3FAX signal transmission and transmission is preferentially executed, so that a flexible ATM network can be designed.

With another aspect of the present invention, a future congested state can be estimated and a transmission rate for G3FAX signal transmission can be changed according to the estimated congestion level, so that a volume of in-coming traffic can be reduced before cell discarding is initiated.

With another aspect of the present invention, even in a case where a communication terminal is a G4FAX machine, by exchanging common line signals in an ATM exchanger, a G3FAX signal transmission function incorporated in a G4FAX machine becomes available, so that a speed can be changed even for a G4FAX machine according to a congestion level.

With another aspect of the present invention, in a case where congestion is relatively light and can be regarded as temporary, by temporarily making larger a packet transmission interval in an ATM exchanger to lower the transmission rate, a volume of traffic flowing into the ATM network can be reduced.

This application is based on Japanese patent application No. HEI 8-74582 filed in the Japanese Patent Office on Mar. 28, 1996, the entire contents of which are hereby incorporated by reference.

Although the invention has been described with respect to a specific embodiment for a complete and clear disclosure, the appended claims are not to be thus limited but to be construed as embodying all modifications and alternative constructions that may occur to one skilled in the art which fairly fall within the basic teaching herein set forth.

What is claimed is:

1. An ATM exchanger for executing statistical multiplex transmission of digitized multimedia data from data terminals connected to a private branch exchange (PBX) over an ATM network, comprising:

a line interface section for connection to a line of said ATM network, including a traffic measuring section for measuring traffic volume on said line;

a PBX interface section for connection to said PBX;

an ATM bus connecting said line interface section to said PBX interface section; and a device control section for controlling operation of said ATM exchanger, including an ATM bus control section for measuring traffic volume on said ATM bus and a congestion state detecting section for detecting a congested state according to measured traffic volume by said ATM bus control section and said traffic measuring section;

wherein upon detection of a congested state, said device control section controls transmission of facsimile data from a facsimile machine through said PBX by reducing the rate of transmission of said facsimile data by a facsimile data processing section in said PBX.

2. An ATM exchanger according to claim 1, wherein said congestion state detecting section collects data on congestion in other ATM exchangers in the ATM network by means of message communications between ATM exchangers and controls a volume of traffic flowing into the line or the ATM bus according to the congestion state in the entire communication path.

3. An ATM exchanger according to claim 2, further comprising a level detecting section for assigning a preference degree to each congestion level identified for each of a plurality of channels in said communication path; wherein a preference degree for use of facsimile transmission is assigned for each channel according to the data from said level detecting section and a volume of traffic flowing into the line or the ATM bus is controlled for a level of congestion according to predetermined use conditions for a user.

4. An ATM exchanger according to claim 3, further comprising a CPU load detecting section for measuring a processor load used in said ATM exchanger and detecting the load state; wherein processing by said ATM exchanger and a volume of traffic flowing into said ATM transmission path or ATM bus is controlled according to the processing load within said ATM exchanger and a congested state in the entire communication path.

5. An ATM exchanger according to claim 4, further comprising a time setting section in said ATM exchanger for controlling a volume of traffic flowing into the ATM transmission path or the ATM bus according to a congested state in the entire communication path for a preset period of time by determining whether a congested state can be detected or not based on information from said setting section.

6. An ATM exchanger according to claim 5, further comprising a traffic estimating section for analyzing a result of detection by said congested state detecting section and estimating changes in traffic and controlling a volume of traffic flowing into the line or the ATM bus for reducing the facsimile transmission rate before a congested state occurs in the ATM exchanger by previously estimating a congested state in the communication path based on data from said traffic estimating section.

7. An ATM exchanger according to claim 6, further comprising a common line signal processing section terminating a common line signal in said PBX interface section, and controlling a volume of traffic flowing into the line or the ATM bus according to a congested state in the communication path, in a case where the communication requested media is determined as G4FAX and the ATM exchanger network is in congestion by converting the G4FAX data to a sound band transmission (G3FAX) in the common line terminating section to provide transmission of the G4FAX data with the G3FAX data function.

8. An ATM exchange according to claim 7, further comprising an ECM control section, and controlling a volume of traffic flowing into the line or the ATM bus by controlling a transmission packet interval in the ECM according to a temporary congestion state in the ATM network with said ECM control section.

* * * * *

UNITED STATES PATENT AND TRADEMARK OFFICE
CERTIFICATE OF CORRECTION

PATENT NO. : 5,903,547
DATED : May 11, 1999
INVENTOR(S) : Kiyoshi Shimokasa

It is certified that error appears in the above-identified patent and that said Letters Patent is hereby corrected as shown below:

Column 1, line 7, "digitalized" should be --digitized --.

Signed and Sealed this

Eighth Day of February, 2000

Attest:

Q. TODD DICKINSON

Attesting Officer

*Commissioner of Patents and Trademarks*